United States Patent
Kohn et al.

(10) Patent No.: US 10,976,065 B2
(45) Date of Patent: Apr. 13, 2021

(54) SYSTEM, METHOD AND COMPUTER PROGRAM PRODUCT FOR AIR FILTER MANAGEMENT

(71) Applicant: Camfil AB, Sverige (SE)

(72) Inventors: Joshua Kohn, Quebec (CA); Richard Ringström, Dalsöfors (SE)

(73) Assignee: Camfil AB, Stockholm (SE)

( * ) Notice: Subject to any disclaimer, the term of this patent is extended or adjusted under 35 U.S.C. 154(b) by 183 days.

(21) Appl. No.: 16/075,046

(22) PCT Filed: Feb. 22, 2017

(86) PCT No.: PCT/SE2017/050169
§ 371 (c)(1),
(2) Date: Aug. 2, 2018

(87) PCT Pub. No.: WO2017/146637
PCT Pub. Date: Aug. 31, 2017

(65) Prior Publication Data
US 2019/0041079 A1    Feb. 7, 2019

(30) Foreign Application Priority Data
Feb. 24, 2016    (SE) .................................. 1650244-5

(51) Int. Cl.
*F24F 11/39*    (2018.01)
*B01D 46/00*    (2006.01)
(Continued)

(52) U.S. Cl.
CPC ............ *F24F 11/39* (2018.01); *B01D 35/143* (2013.01); *B01D 46/0086* (2013.01);
(Continued)

(58) Field of Classification Search
CPC .. F24F 11/39; F24F 11/63; F24F 11/30; F24F 3/1603; F24F 2110/50; F24F 2110/52;
(Continued)

(56) References Cited

U.S. PATENT DOCUMENTS 6,423,118 B1    7/2002    Becerra et al.
7,261,762 B2    8/2007    Kang et al.
(Continued)

FOREIGN PATENT DOCUMENTS

| RU | 2390367 C2 | 5/2010 |
| WO | 2015042960 A1 | 4/2015 |
| WO | 2015073698 A1 | 5/2015 |

OTHER PUBLICATIONS

Office Action from Canadian Patent Application No. 3,013,201 dated Oct. 4, 2019.
(Continued)

*Primary Examiner* — Robert Clemente
(74) *Attorney, Agent, or Firm* — Patterson + Sheridan, LLP (57) ABSTRACT

The present invention relates to a system (40) for air filter management, the system comprising a plurality of air filter devices (41*a,b*) and an air filter control station (42). Each air filter device (41*a,b*) is provided at an air filter arrangement in an air flow inlet to an industrial installation and comprises at least one filter medium capable of removing particulate material and/or airborne molecular contamination, AMC, from an air flow received at the air flow inlet. Each air filter device comprises a set of sensors arranged to gather sensor data representative of an operating state of the air filter arrangement, a microprocessor and a communication unit. The air filter control station (42) comprises communication unit arranged to receive operating state information from the plurality of air filter devices and a user interface for selecting an air filter arrangement of an air filter device. The air filter
(Continued)

control station also comprises processing circuitry arranged to estimate a life expectancy of the selected air filter arrangement based on the operating state information received from an air filter device provided at the selected air filter arrangement and on operating state information received from one or more other air filter devices provided at other filter arrangements.

17 Claims, 5 Drawing Sheets (51) Int. Cl.
   *B01D 46/46* (2006.01)
   *F24F 3/16* (2021.01)
   *F24F 11/30* (2018.01)
   *F24F 11/63* (2018.01)
   *B01D 35/143* (2006.01)
   *F02C 7/052* (2006.01)
   *F24F 110/50* (2018.01)
   *F24F 110/52* (2018.01)

(52) U.S. Cl.
   CPC ............. *B01D 46/46* (2013.01); *F02C 7/052* (2013.01); *F24F 3/1603* (2013.01); *F24F 11/30* (2018.01); *F24F 11/63* (2018.01); *B01D 2279/60* (2013.01); *F05D 2260/607* (2013.01); *F24F 2110/50* (2018.01); *F24F 2110/52* (2018.01)

(58) Field of Classification Search
   CPC ................ B01D 46/0086; B01D 46/46; B01D 2279/60; F02C 7/052
   See application file for complete search history.

(56) References Cited

U.S. PATENT DOCUMENTS

| | | |
|---|---|---|
| 2005/0247194 A1 | 11/2005 | Kang et al. |
| 2014/0208942 A1 | 7/2014 | Scipio et al. |
| 2015/0241318 A1 | 8/2015 | Hamann et al. |
| 2015/0283491 A1 | 10/2015 | Salahshour et al. |

OTHER PUBLICATIONS

International Search Report and Written Opinion from PCT/SE2017/050169 dated May 31, 2017.
Office Action and Search Report from Russian Patent Application No. 2018133452 dated May 27, 2019, with translations.
Office Action from Chinese Patent Application No. 201780013608.X dated Jan. 3, 2020.
Office Action from Chinese Patent Application No. 201780013608.X dated May 29, 2020.
Office Action from European Patent Application No. 17712256.1-1008 dated Jul. 10, 2020.

SYSTEM, METHOD AND COMPUTER PROGRAM PRODUCT FOR AIR FILTER MANAGEMENT

TECHNICAL FIELD

The present disclosure relates to a system, method and computer program product for air filter management of an air filter arrangement in an air flow inlet to an industrial installation.

BACKGROUND ART

Many industrial installations require a large supply of intake air, e.g., to support a combustion process or to cool the industrial installation during operation. It is desirable to filter the inlet air for the purposes of removing various particles and/or gaseous matter and the like which may be entrained in the air, and thereby provide a better quality conditioned inlet air. For this purpose, industrial filter arrangements may be provided at the air flow inlet. The filters are arranged so that inlet air generally passes through a series of filters to remove the contaminants; contaminants that otherwise could cause damage that would reduce the life expectancy and performance of the industrial installation.

As can be appreciated, filters in such arrangements gradually accumulate matter from the air and as this matter accumulates on the filter the resistance to flow of air through the filter increases. Industrial filter arrangements are clogged up by particles trapped in the air filters but also by environmental conditions such as fog, rain, snow, and the like. The clogging may reduce filtration and operating efficiency while increasing the overall pressure drop. An increase of the pressure drop over the filter arrangement implies an inlet air pressure loss that may affect the operation and performance of the industrial installation.

In a typical industrial filter arrangement, a plurality of air filters are arranged in a sequential set up. The first filter is usually a coarse filter arranged to remove larger particles in the air. The pressure drop increase over such a coarse filter may be insignificant. An intermediary filter may be arranged to protect the air flow inlet from mid-size particles. The air quality reaching the industrial installation, e.g., a turbine, is determined through the use of a final filter arranged to collect particles of smaller sizes, e.g. saline particles. The problems with clogging is particularly true with final filters, where the gathering of small particles may alter the qualities of the filter in such a way that the air feed to the receiving industrial installation may be reduced resulting in a decrease in operating efficiency or requiring more energy to receiving fans to avoid such decrease in operating efficiency. In some ventilation systems, the flow to the receiving installation is not allowed to change, thus requiring increased energy to the fans when upon reduced throughput in the filters.

Combustion turbine power plants, e.g., gas turbine power plants, are examples of industrial installations that require a large supply of intake air to support the combustion process. Other examples worth mentioning are turbine powered compressor stations or turbine powered mechanical drives. In order to protect a combustion turbine from impure air with dust particles, salt, and other contaminants that may damage the compressor blades and parts of the power plant equipment, air filter arrangements are provided at the air flow inlet to the combustion turbine.

A filter has a certain lifespan during which it functions adequately. The lifespan depends on different factors such as particle density in the air, the flow of air etc. There is a cost involved in exchanging a filter. This cost can comprise different parts such as the cost for the filter itself, the cost for the transport of the filter, the cost of the work required to exchange the filter or other environmental costs such as the carbon dioxide footprint etc. From a filter cost perspective, the filters should be used as long as possible until their technical lifetime has come to an end, e.g., at a time when a pressure loss over the filter results in inadequate air supply in support of the combustion process. Historically, the performance of the air filters in industrial applications, such as in conjunction with plants, has been mostly estimated relative to the efficiency (separation capability) and pressure loss (pressure drop) without taking the cost aspects of filter change into consideration. However, a problem when trying to benefit from the full technical life span of a filter is that the increased clogging of the filter and the related pressure loss induces increased energy consumption during operation. There exists known ways of determining the cost for the increased energy consumption due to operation with a clogged filter.

U.S. Pat. No. 6,009,404 discloses a method and device for cost-oriented monitoring operation of a filter arrangement. A plurality of sensors is used to obtain information relevant for determining an operating state of the filter. An evaluation unit is provided wherein information gathered in the sensors is processed and used to determine operating costs associated with the determined operating state of the filter.

SE537506 describes a method of determining an optimal time for operating a filter in a ventilation system in order to save costs and leave as little carbon dioxide footprint as possible. The method is based on obtaining information on environmental impact for manufacturing a new filter, information on environmental impact from using the present filter and information relevant for determining an operating state of a filter. An optimal lifetime for a filter in the ventilation system is determined based on this information. Thus, a life-cycle cost analysis is provided wherein environmental aspects are taken into account.

While the mentioned prior art provides decision support systems for determining an optimal filter use time for a specific type of filter in a given application, the optimal filter use time is based on estimates from current conditions in the specific industrial installation. Current conditions may be established with high accuracy, but there is a lack of actual data for continued operation of the filter arrangements and estimates for future operating states of the industrial installation may be quite unreliable. When considering the combustion turbine scenario, the main problem when using a filter with an inadequate operating state is not the increase of energy consumption for operating the combustion turbine, but a reduction in the output of the turbine. The impact of such a reduction in the output of the turbine is so significant that even a fairly moderate reduction in the operating state of a filter, may imply a high loss in production for a plant owner. Another problem for the plant owner is that an exchange of filter may require reduced operation during the time needed for the filter exchange.

For the above reasons, there is a need to improve air filter management and to provide accurate estimates of operational data for an air filter arrangement at an industrial installation.

SUMMARY

It is an object of the present invention to improve air filter management. In particular, it is an object of the present invention to improve air filter management of an air filter arrangement in an air flow inlet to an industrial installation and to provide accurate estimates of operational data for an air filter arrangement at the industrial installation.

The proposed solutions enable improve air filter management in that improved estimates for a technical lifetime, life expectancy, and lifecycle costs are generated and in that operators may gain an improved understanding of cost of filter replacement versus the cost of maintaining a filter when filter capacity has started to deteriorate.

This object is achieved by a system, a method and a computer program product for air filter management as disclosed in the independent claims.

The disclosure presents a system embodiment, wherein a system comprises air filter devices and an air filter control station. Each air filter device is provided at an air filter arrangement in an air flow inlet to an industrial installation; the air filter arrangement comprising at least one filter medium capable of removing particulate material and/or airborne molecular contamination, AMC, from an air flow received at the air flow inlet. Each air filter device comprises a set of sensors arranged to gather sensor data representative of an operating state of the air filter arrangement, a microprocessor arranged to determine operating state information for the air filter arrangement based on the gathered sensor data, and a communication unit arranged to transmit the operating state information. The air filter control station comprises a communication unit arranged to receive operating state information from a plurality of air filter devices and a user interface for selecting an air filter arrangement. The air filter control station also comprises processing circuitry arranged to estimate a life expectancy of the selected air filter arrangement based on operating state information received from an air filter device provided at the selected air filter arrangement and operating state information received from one or more other air filter devices provided at other air filter arrangements.

Input from a plurality of uncorrelated air filter devices provides for improvements in air filter management and in the reliability of the estimates generated with regard to life cycle cost of an air filter arrangement for a specific industrial installation. As will be appreciated, access in a centralized application to reliable life cycle data for an air filter arrangement, provides for a reliable estimate of future operating conditions for the air filter arrangement, a better informed decision on the side of the operator to make replacements in the air filter arrangement, and the ability for an air filter provider to predict the need to maintain air filter replacement units in the premises of a warehouse for sale or distribution.

According to an aspect of the disclosure, the system receives data from at least one air filter device provided in an air filter arrangement in an air flow inlet to another industrial installation than the air filter device of the selected air filter arrangement.

The ability to base predictions in an air filter control station on input from a plurality of air filter devices, including air filter devices situated at different sites of corresponding industrial installations, provides the advantage of truly enabling estimation based on a significantly substantial amount of data for reliably using the estimate. Limited access to measured sensor data relevant for air filter management of a specific air filter arrangement implies that the credibility of the estimates could be low. Furthermore, access to true data representing measurements performed during air filter management, enables faster generation of the estimates in real-time.

According to another aspect of the disclosure, the set of sensors comprises one or more of a flow sensor, a humidity sensor, an ambient dust concentration sensor and a pressure drop sensor.

The set of sensors comprising sensors of different sensing capabilities provides a comprehensive representation of filter qualities and ambient air qualities. The use of a plurality of sensors measuring varying aspects having an impact on airflow to the receiving industrial installation provides the advantage of an improved understanding of the operating conditions for the industrial installation and the cause of these operating conditions.

According to another aspect of the disclosure, the air filter control station is further arranged to receive performance data for industrial installations corresponding to respective air filter arrangements, and to estimate a life cycle cost based on the estimated life expectancy and performance data for the industrial installation of the selected air filter arrangement.

Access to performance data provides the advantage that the life cycle cost of an air filter arrangement may be based on both the filter replacement cost and costs derivable from impact of the air filter arrangement on performance of the industrial installation. Consequently, a decision to replace or condition an air filter installation may be based on a proper understanding of the economic consequences of replacing or maintaining an air filter arrangement over time.

According to an aspect of the disclosure, the life cycle estimate is also based on performance data received from one or more other air filter devices provided at other air filter arrangements.

Hence, the present invention provides for aggregation of data from air filter arrangements provided at industrial installations performing similar operations and experiencing similar operating conditions. Access to larger set of relevant data provides for improvements in the estimates of operational data and costs.

According to an aspect of the disclosure, the performance data is obtained by the air filter device of the industrial installation of the selected air filter arrangement. The obtained performance data is then transmitted to the air filter control station. According to another aspect, a user interface for manual or automatic submission of performance data is be provided in the system. The user interface provides the advantage of enabling feedback of performance related data that may be correlated to filter functionality.

According to another aspect of the disclosure, the life expectancy of a selected air filter arrangement is based on a trend line of pressure drop in the air filter device.

According to another aspect of the disclosure, the trend-line of pressure drop in the air filter device is calculated from a correlation of sensor data from one or more pressure drop sensors, and sensor data of at least one flow sensor, ambient dust concentration sensor and/or humidity sensor.

The correlation of sensor data from an ambient dust concentration sensor and from one or more filter pressure drop sensor together with sensor data from a flow sensor provides the benefits in that sensor data from air filter devices having similar operating conditions may be determined, while sensor data from other air filter devices may be excluded from the estimation generating process.

The above advantage is also true for when the trend-line of pressure drop in an air filter device is calculated from a correlation of sensor data of at least one humidity sensor together with sensor data from a flow sensor and sensor data from one or more filter pressure drop sensors. Again, sensor data from sensors having similar operating conditions may be established while sensor data from other air filter devices less relevant for the purposes of estimating a life expectancy of a filter in a certain operating environment are excluded.

The disclosure also presents a method embodiment, performed in an air filter control station of the above disclosed system for air filter management and all variations of this system. The method comprises receipt of operating state information from a plurality of air filter devices, and receipt of a query, over a user interface, for a selected air filter arrangement of an air filter device. An estimate of life expectancy of the selected air filter arrangement is provided based on operating state information received from an air filter device of a selected air filter arrangement and operating state information received from one or more other air filter devices provided at other air filter arrangements.

The disclosure also presents a computer program embodiment relating to a computer program comprising computer program code that causes a system for air filter management to perform the above method when executed.

The method embodiment and the computer program embodiment provide the advantages previously discussed for the system embodiment.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout. The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
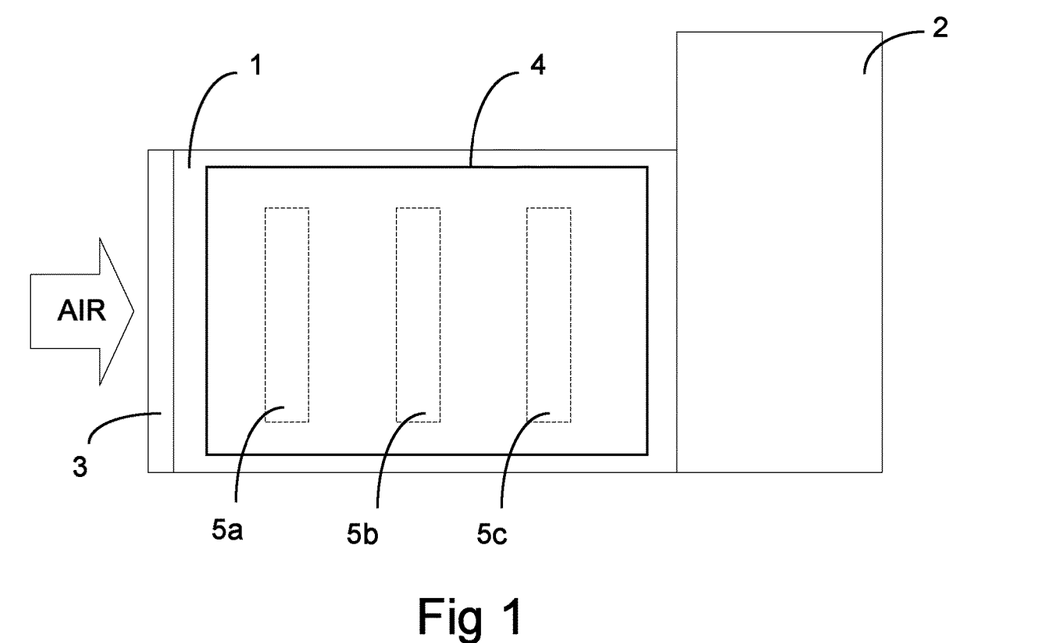
FIG. 1 is an example view of an air inlet to an industrial installation.

FIG. 1 illustrates an example view of an air flow inlet 1 to an industrial installation 2, e.g., to a combustion turbine that mechanically powers an electrical generator in a turbine power plant, a turbine powered compressor station or a turbine powered mechanical drive. Ambient air is supplied to the industrial installation 2 through an air intake 3. While being readily available, a problem with an ambient air supply is that the ambient air contains at least some degrees of material that may be contaminating. A supply of ambient air to the industrial installation consequently implies a supply of contaminating material. The use of ambient air may be more or less problematic depending on the environment where the industrial installation is situated. For the situation of a combustion turbine plant, close to a densely populated area with a high degree of pollution, small particles residing in the air might be drawn into the combustion chamber of the turbine and have detrimental effects on the long term operation of the turbine. One or more air filter arrangements 4 in the air flow inlet to the industrial installation turbine provides means to overcome the problems associated with using ambient, impure air As disclosed in FIG. 1, an air filter arrangement 4 is positioned in the air flow inlet 1 to the industrial installation 2. The disclosed air filter arrangement 4 comprises a three air filter units 5a-c, with varying filter qualities, e.g., a coarse air filter unit 5a of a lower filter class, an intermediary air filter unit 5b and a final filter unit 5c capable of filtering out particles of very small sizes. This means that coarser materials such as e.g. insects or sand particles can be entrapped by a particle filter unit closer to the air intake 3, while small particles such as salt and airborne molecular contamination, AMC, is removed from the air stream in a more downstream filter unit. Each air filter unit 5a-c has an upstream surface directed towards the air intake 3 and a downstream surface directed towards the industrial installation 2, by which is meant that the upstream surface is the side of the filter unit that is first reached by the air flow and the downstream surface is on the side where the air stream leaves the filter unit after having passed through a filter medium in the filter unit. Other air filter arrangements 4 are also possible, e.g. air filter arrangements 4 comprising filter units positioned in a V-shape with a peak facing the incoming air flow and air filter arrangement containing any number of filter units 5a-c. Ambient air is supplied to the industrial installation 2 through the air flow inlet 1. Each filter unit 5a,b,c of the filter arrangement represents a separate filtering step with specific characteristics with regard to susceptibility for clogging and changes in pressure drop.

When in operation, contaminants in the ambient air are removed in the filtration process. This implies that the contaminants are retained in the air filter arrangement 4, while the cleaned air is allowed to pass into the industrial installation 2, e.g. a turbine. An effect of the filtration and the retaining of contaminants in filter units is that these filter units 5a-c will eventually need replacement due to clogging up from said contaminants.

The air filter arrangements 4 provides for replacement of the filter units 5a-c. However, despite efforts to enable easy filter replacement, the filter replacement services usually require restrictions in the operation of industrial installation during replacing, having a negative impact on performance of the industrial installation. In addition to production loss, the filter replacement is also associated with costs for the filter hardware and for the service cost of performing the filter replacement service. Life cycle cost analysis is common when setting up filter exchange programs with the aim to schedule filter replacements so that these are made prior to expiry of the technical life time, while maximizing the economic life time.

The performance of the filter units 5a-c in the air filter arrangement 4 is determined based on separation capability and changes in pressure loss/drop over a filter unit. While separation capability may be maintained in a clogged up filter, the clogging will inevitably result in an increase of pressure loss over the filter, which will in turn impair the efficiency of the combustion turbine. Techniques for estimating the performance of an air filter are well known; using sensors to determine pressure loss and separation capability. Prior art solutions include sensor equipment installed in an air filter arrangement or in the vicinity of an upstream or downstream surface of the air filter arrangement and capable of delivering sensor data to an operator station in the industrial installation, e.g., a power plant. The sensor equipment may include one or more sensor probes arranged to acquire such sensor data as air flow, humidity, and filter pressure drop. The sensor data is processed in processing circuitry in the vicinity of the sensor probes or in the operator sensor. However, the draw-back with these known applications is that the estimates are quite un-precise and may leave the operator in doubt with regard to cost and benefits of changing a filter and also provides little room for the operator to improve future filter estimates.

Figure 2:
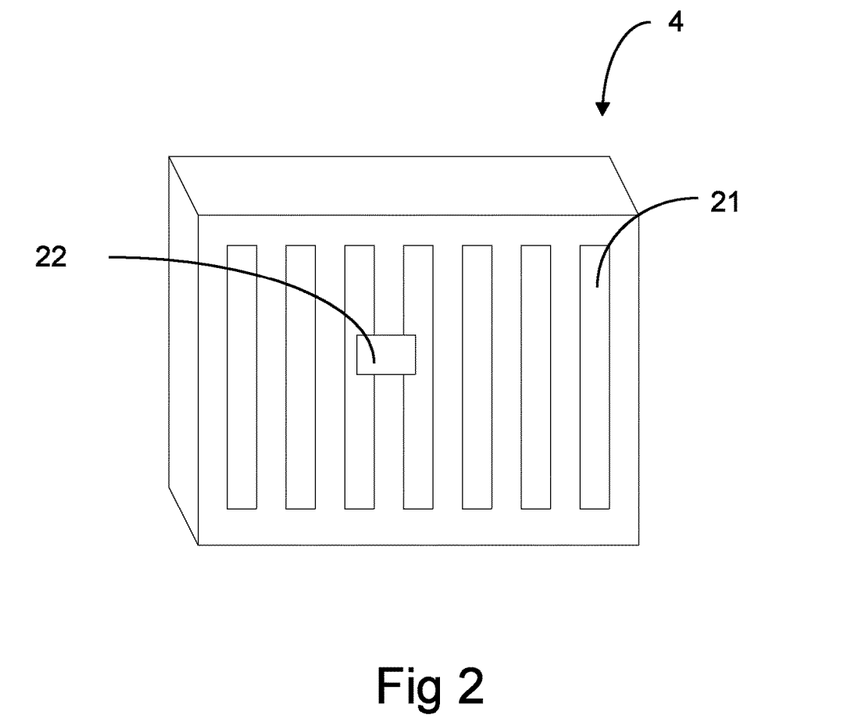
FIG. 2 is an example view of an air filter arrangement containing an air filter sensor device.

FIG. 2 is an example view of an air filter arrangement 4 according to an aspect of the present disclosure. Turning back to FIG. 1, the air filter arrangement 4 is configured to fit in the air flow inlet to an industrial installation, e.g., a combustion turbine power plant, as disclosed in FIG. 1. The air filter arrangement comprises at least one filter unit, but could of course include any number of filter units 5a,b,c or stages as described in relation to FIG. 1. Ambient air of certain humidity and containing airborne contamination enters the air filter arrangement 4 through an air intake 3, and the air stream passes through one or more filter units 5a-c and exits into the industrial installation. The filtered air is supplied to an industrial installation sensitive to contamination, e.g. through airborne molecular contamination, AMC, or salt particles. According to an aspect of the disclosure, a plurality of filter units 5a-c may be provided, including a final high class filter capable of removing even the finest particles, but also sensitive to clogging. The air filter arrangement 4 is configured to fit tightly into the air inlet 3 to the industrial application so that the air supply to the industrial installation is achieved through the filter arrangement 4 and subject to filtering on its way to the industrial installation. In addition to the filter units 5a-c capable of removing particulate material and/or airborne molecular contamination, AMC, from an air flow received at the air flow inlet, the air filter arrangement contains an air filter device. Turning back to FIG. 2, the air filter arrangement contains an air filter device 22 attached at an upstream air receiving side or a downstream filtered air delivering side of the air filter arrangement 4. Parts of the sensor device may also be included in a frame of the air filter arrangement. While FIG. 2 discloses the air filter device in an attached position, it should be understood that the air filter device may also be handled as an integrated part of the air filter arrangement. When deploying an air filter arrangement with an integrated air filter device configuration, the air filter device is replaced upon replacement of the air filter arrangement. With the configuration disclosed in FIG. 2, the air filter device may be removed from the air filter arrangement and reused on the replacement filter arrangement. According to an aspect of the disclosure, the air filter device 22 may also be configured to induce a vortex pattern in the air flow when contained in an air filter arrangement, e.g., in the air filter arrangement of FIG. 2.

Figure 3A:
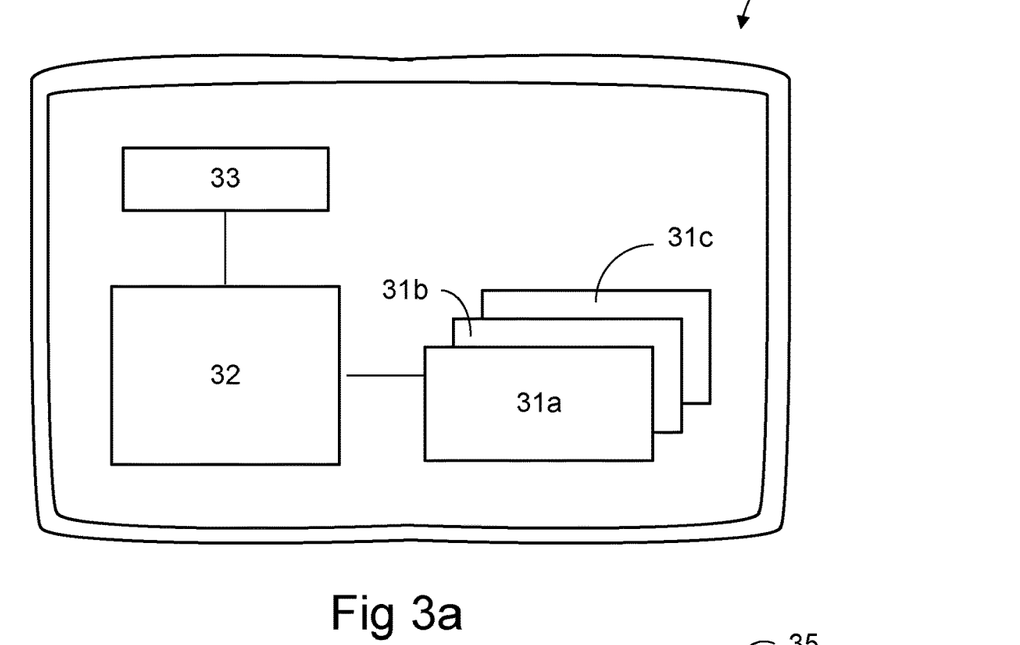
FIG. 3a is a block diagram for an air filter device.

FIG. 3a discloses a block diagram of an air filter device 22 configured to be contained in an air filter arrangement 4. The air filter device includes one or further sensors 31a,b,c representative of an operating state of the air filter arrangement, e.g., one or more of a filter pressure drop sensor, a humidity sensor, and/or an ambient dust concentration sensor that may be incorporated into a compact housing. According to aspects of the disclosure, the various sensors may also be at physically distinct locations in the vicinity of the air filter arrangement, whereupon the sensors are configured to transfer sensor data to the receiving air filter device 22. According to a further aspect of the disclosure, the air filter sensor device is further configured to receive sensor data from air flow determining means for determining an air velocity of the air flow received at the air flow inlet. According to an aspect of the disclosure, the air flow determining means is a vortex sensor configured to determine a pressure pulse attributable to the vortex pattern. According to another aspect of the disclosure, the air flow determining means is a pitot sensor configured to determine an air speed of the air flow received at the air flow inlet. Use of other types of anemometers is of course also within the scope of the present invention, e.g., thermal anemometers, sonic anemometers or any other type of anemometer that may be fitted into a compact air filter device. The air sensor device may comprise or receive sensor data from a particle counter arranged to count particles following the final filter of the air filter arrangement. The count of particles may be correlated to engine degradation and used to predict future degradation.

According to aspects of the disclosure, the air filter device 22 also comprises a microprocessor 32 arranged to process sensor data received from said sensors 31a-c to determine operating state information for the air filter arrangement, e.g., an estimated remaining technical lifetime of the air filter arrangement or an estimated filter degradation. A communication unit 33 is arranged to transmit the operating state information to a receiving air filter control system. Hence, the air filter device may be configured as a smart device including control circuitry, i.e., a microprocessor, for on-site processing of retrieved sensor data. According to an aspect of the disclosure, the air filter device may also be configured as a sensor system including a variety of separate sensors arranged to transmit sensor data to a receiving processing unit. The communication unit 33 in the air filter device is configured to transmit the determined operating state information to a receiving air filter control station. The microprocessor 32 of the air filter device 22 is arranged to receive or obtain data from the set of sensors 31a-c, e.g., on a continuous basis recording values according to predetermined time intervals. According to aspects of the disclosure, the microprocessor 32 is embodied in a printed circuitry board with a CPU that collects signals and records the data every 20 minutes. The microprocessor is arranged to perform a Fast Fourier transform on one of the signal outputs resulting in a discrete peak value that may be stored in a memory of the air filter device and/or transferred to the air filter control station. Data storage of approximately 500 kB per month is expected for each air filter device, thus, a memory is also foreseen in the air filter device.

The processed sensor data is communicated to a receiving air filter control station capable of processing operating state information received from a plurality of air filter devices, e.g., a plurality of devices located at the same industrial installation or at varying industrial installations. A system comprising the air filter control station and one or more air filter devices will be described in the following with reference to FIG. 4. According to an aspect of the present disclosure, the communication unit 33 may be any type of wireless communication unit configured for machine to machine communication, e.g. using WiFi, GSM, LTE or any type of suitable wireless technology. While not specifically illustrated, one or more batteries may be provided in the air filter device to power the communication unit, the sensors and/or the microprocessor. The air filter device may also be powered from a powerline, using battery power for back-up purposes or through any combination of powerline powering and battery power, e.g., in a configuration where the air filter device is configured by remotely battery operated sensors and a main computer receiving the sensor data.

Figure 3B:
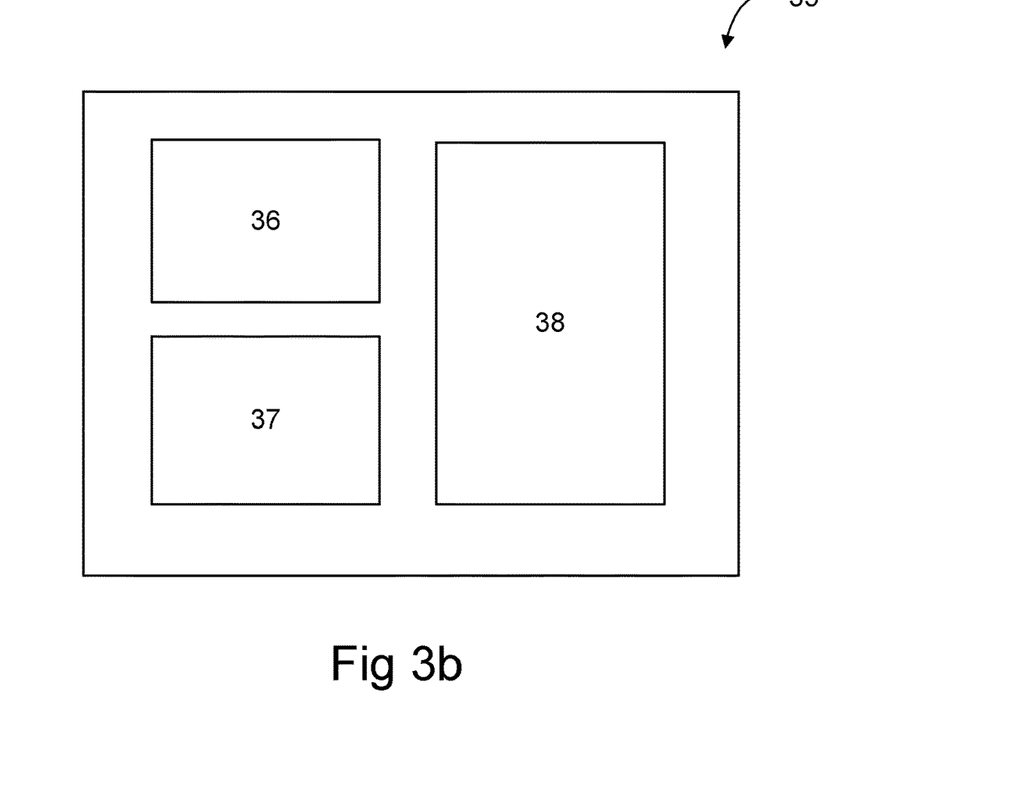
FIG. 3b is a block diagram for an air filter control station.
Figure 7A:
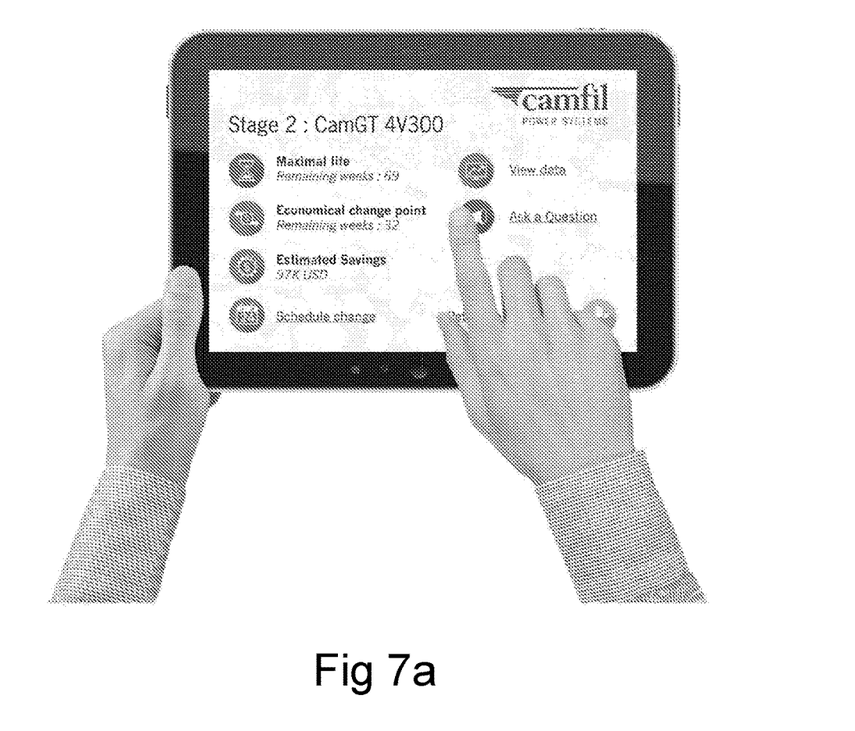
FIG. 7a,b are example views of a user interface illustrating exemplary input and output to the system for air filter management.

FIG. 3b discloses a block diagram of an air filter control station. The air filter control station comprises a communication unit arranged to receive operating state information from a plurality of air filter devices, e.g., over the Internet. The communication unit may be configured as a wired link providing access to the Internet, or as a wireless link provided by WiFi or a mobile data connection. Processing circuitry of the air filter control station is arranged to process the received operating state information and to estimate a life expectancy of a selected air filter arrangement. The processing circuitry may comprise processing circuitry provided in an operator station providing a user interface to the air filter control station, but the processing circuitry may also comprise remote server capability accessible through the operator station, e.g. from a central or distributed server environment such as a cloud environment. FIG. 7a discloses an exemplary embodiment of such an operator station configured as an application for a computer, a tablet or a mobile device such as a smart phone.

Figure 4:
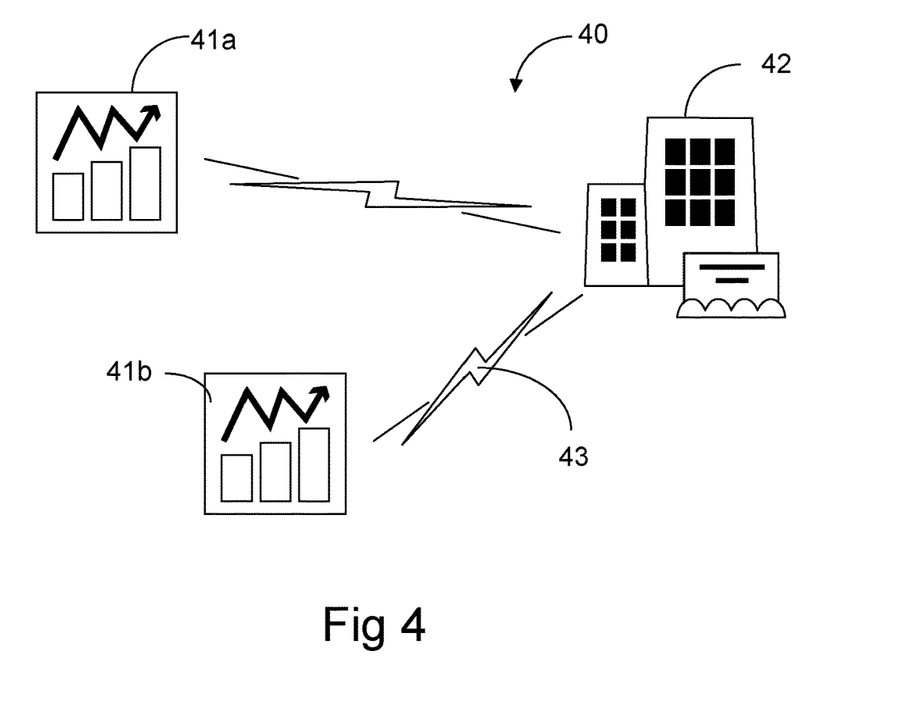
FIG. 4 is a block diagram for a system for air filter management.

FIG. 4 discloses an exemplary block diagram of a system for air filter management comprising an air filter control station 42 and one or more air filter devices 41a,b. In the air filter management system, each air filter device 41a,b is contained in an air filter arrangement configure to fit in an air flow inlet to an industrial installation, e.g., a gas turbine power plant or any other type of combustion turbine power plant. The air filter arrangement comprises at least one filter medium capable of removing particulate material and/or airborne molecular contamination, AMC, from an air flow received at the air flow inlet. The air filter control station 42 of the system is provided at a location remote from the one or more air filter arrangements, e.g., in an operations control environment of the industrial installation or as a software application accessible through a computer, tablet or mobile device. Each air filter device 41a,b of an air filter arrangement comprises a communication unit for wireless transmission of sensor data to the air filter control station 42. However, transmission is not perceived as direct device to device communication, but to be performed over intermediate network structures such as conventional data network structures. A wireless link is illustrated between each air filter device and the air filter control station to illustrate that at least part of the communication between the air filter device and the air filter control station will normally involve a wireless communication link.

The air filter devices 41a,b of the system are provided in air filter arrangements located at different geographical locations, such as in air filter arrangements located at different combustion turbine power plants when considering the power plant application. Other industrial installations are of course also within the scope of the present disclosure, such as gas turbines for compressor stations or gas turbines for boats or off shore applications. The air filter control stations is configured to compile data from a plurality of air filter devices, preferably air filter devices of differing locations and to use the compiled data in order to establish a reliable estimate for a remaining life span and cost of operating the corresponding air filter arrangements in a specific industrial installation.

As mentioned above, aspects relating to clogging and pressure drop vary between the filter units of the disclosed filter arrangement. Consequently, the system for air filter management may comprises a set of sensors arranged in a plurality of air filter devices comprising sensors positioned on or in the vicinity of one or more specific filter units or a single air filter device comprising a greater number of sensors positioned on or in the vicinity of several filter units in the filter arrangement. The one or more air filter devices are arranged to gather sensor data representative of the operating state of the air filter arrangement for the specific industrial application. By sensor is meant a device comprising one or more sensing probes and an instrument capable of sensing a condition to be monitored. The sensors disclosed in FIG. 3a may comprise one or more of a flow sensor, a humidity sensor, an ambient dust concentration sensor and a pressure drop sensor. The output obtained from each sensor is an output value corresponding to the measured condition, e.g. airflow of cubic metres per hour, relative air humidity in percent, a dust concentration of grams of dust per cubic metre and a relative pressure drop dP.

The air filter device 41a,b containing the sensors is included in the air filter arrangement, e.g., within the frame work of the air filter arrangement, on an upstream side of a filter unit or on a downstream surface of a filter unit. The air filter device may also receive additional input from sensors positioned outside of the air filter arrangement, e.g. some sensors positioned on an upstream side of the air filter arrangement, while others are placed on the downstream side. As disclosed, air filter devices may be arranged on the surface or in the vicinity of two or more filter units in the filter arrangement. Thus, the output from the air filter control station may include input from a plurality of air filter devices in the same air flow inlet, but where the input for the respective air filter devices differs with regard to the sensor data input, e.g., content of particles and pressure drop. The use of a plurality of air filter devices allows for a more detailed and balanced information of the condition of the filter units in a filter arrangement, providing information on which filter that may be most economical to change and also viable estimates on a remaining lifetime on the present filter units.

The air filter devices are arranged to collect air filter data, but may according to aspects of the disclosure also collect performance data. Such data may also be retrieved to the air filter control station directly from an operator environment of the industrial installation.

Turning back to FIG. 4, the block diagram discloses a system 40 for air filter management comprising at least two air filter devices 41a,b provided at air filter arrangements of uncorrelated air flow inlets to respective industrial installations and an air filter control station 42. According to an aspect of the disclosure, each air filter device 41a,b is embodied as described with reference to FIG. 3a. A microprocessor is communicatively connected to one or more sensors 31a-c, e.g., a flow sensor, a temperature and/or humidity sensor, an ambient dust concentration sensor and/or at least one sensor for determining filter pressure drop over the filter. According to another aspect of the disclosure, each air filter device 41a,b is integrated with a respective the air filter arrangement, e.g. on an upstream or downstream side of the air filter arrangement.

According to an aspect of the disclosure, each air filter device 41a,b is arranged to transmit the collected data on a regular basis, e.g. by using a wireless link 43, in machine to machine communication. Even though the block diagram discloses a direct wireless link between each air filter device 41a,b and the air filter control station 42, it is obvious to a person skilled in the art that the entities may communicate by means of a multitude of wireless nodes so that wireless communication is used for delivering data from the air filter devices to a receiving control station, but that wireless links may not be needed in every communication instance from each air filter device 41a,b to the air filter control station 42. It should also be understood that the air filter control station may include one or more cooperating entities, where a user interface may be provided, e.g., as an application in a computer, mobile phone or on a tablet, while the actual processing is performed in a cloud environment, e.g., by cooperating servers located in different locations or in a same geographical location. For the case of failed transmission, local storage for up to 6 months data is also foreseen in the air filter device. As mentioned, the air filter device also comprises a memory arranged to provide for such local storage and may also comprise a power supply or power reservoir.

The system 40 for air filter management comprises a plurality of air filter devices 41a,b and an air filter control station 42. Each air filter device 41a,b is provided at an air filter arrangement in an air flow inlet to an industrial installation, which air filter arrangement comprises at least one filter medium capable of removing particulate material and/or airborne molecular contamination, AMC, from an air flow received at the air flow inlet. Each air filter device 41a,b comprises a set of sensors, i.e. at least flow determining means for determining air velocity and preferably also sensors to determine pressure drop over the air filter arrangement containing the air filter device, arranged to gather sensor data representative of an operating state of the air filter arrangement. Each air filter device 41a,b further comprises a microprocessor and a communication unit. The air filter control station 42 also comprises a communication unit arranged to receive sensor data from the plurality of air filter devices 41a,b. The air filter control station provides a user interface for selecting an air filter arrangement of an air filter device 41a. Processing circuitry of the air filter control station is arranged to estimate a life expectancy of the selected air filter arrangement 41a based on operating state information determined from sensor data gathered in the air filter device 41a of the selected air filter arrangement and on the sensor data received from one or more other air filter devices 41b.

According to an aspect of the disclosure, the air filter device comprises one or more of the following sensors: a temperature and humidity sensor, pressure drop sensor(s), ambient dust sensor and an air flow sensor. Thus, the air filter device may provide a comprehensive set of sensor data required in air filter management. According to an aspect of the disclosure, the air flow sensor may determine air speed using a custom vortex flowmeter. A pressure sensor installed facing away from the airflow is used to determine pressure variations and the frequency of these variations. A Fast Fourier Transform is performed for the input from the pressure sensor, resulting in an FFT that is used to determine the main frequency of vortex shedding caused by the moving air. From this frequency, the speed of moving air can be determined.

Input from the air flow measurements may also be used when calculating pressure loss and a pressure loss trend, dP trend. The dP trend depends on the pressure loss due to dust loading in the filter, but also to pressure loss due to humidity and rain. Pressure loss due to dust loading in the filter may be correlated to dust concentration ($g/m^3$) and airflow ($m^3$/hour). The pressure loss due to humidity may be estimated from a correlation to humidity.

The output of an industrial installation, such as a combustion turbine, depends on the air flow to the combustion chamber of the turbine. A change in air flow will have significant impact on the output of the combustion turbine; thus, there is a need to normalize data for airflow.

According to the principles of the present invention, the air filter arrangement is used as a well-defined measurement platform for measuring a broad range of sensor data. Components contained in the air filter device, and consequently also in the air filter arrangement, are used to generate more accurate life expectancy estimates based on highly reliable sensor data.

From a filter management perspective, dust concentration in the ambient air is also a significant input for the assessment of the benefits/needs for a filter change. Furthermore, measurement of ambient air dust concentration also provides a prerequisite for benchmarking between different sites and different filter, i.e. to base the filter management on a larger set of data than what have been used in prior art filter management applications. The inventors have discovered that more accurate estimates may be produced when compiling sensor data from a plurality of air filter devices, representative of the same categories of industrial installations, in a central depository, i.e. an air filter control station. Thus, the present invention provides a means to improve life expectancy estimation for each specific air filter device and also to improve life cycle cost estimating.

Prior art solutions are based only on the specific conditions for the filter unit for which pressure loss is determined and the process of building up enough sensor data to enable accurate estimates of future filter conditions may prove quite time consuming. The inventors have realized that it would be possible to improve access to sensor data, by allowing use of sensor data from a plurality of independent entities, air filter devices, when estimating a life time of one or more filter units of an air filter arrangement in an industrial installation such as a combustion turbine power plant. Furthermore, the inventors present a solution for aggregating data so that such accurate estimates are at hand. According to an aspect of the disclosure, data from air filter devices residing at another industrial installation, representing the same type of industrial installation, may be used to improve the estimation for an air filter arrangement.

According to other aspects of the disclosure, the invention is based on determining ambient conditions for air filter devices providing uncorrelated sensor data and to use normalized sensor data from a plurality of air filter devices to improve life expectancy estimates for a given node. It is a problem with typical estimations of filter life that these are done based on lab calculated Dust Holding Capacity, DHC. However, the inventors have found that a filter that can hold 100 grams of "lab dust" before needing replacement, may in fact have a technical lifetime implying a loading of somewhere between 50 to 300 grams of "real world" dust. Typically, prior art solutions for estimating life expectancy of an air filter arrangement of a specific industrial installation, rely on a guess as to how much "real world" dust that may be comprised in the filter, but the uncertainties of such a guess are quite significant. By determining the relationship between pressure build-up in a filter unit vs site dust, it is possible to make legitimate comparisons between different filter types and sites and to use data from various filter types and sites when generating an estimate of life expectancy or of life cycle cost.

Once the pressure loss due to filter condition can be determined, it is possible to calculate how much this affects the performance of the industrial installation, e.g., reduces the output of a combustion turbine power plant and this may be presented in terms of monetary value, e.g., dollar value.

According to an aspect of the disclosure, each air filter device may also include LED status lights that are used to indicate that a corresponding filter unit is in need of replacement.

Figure 7B:
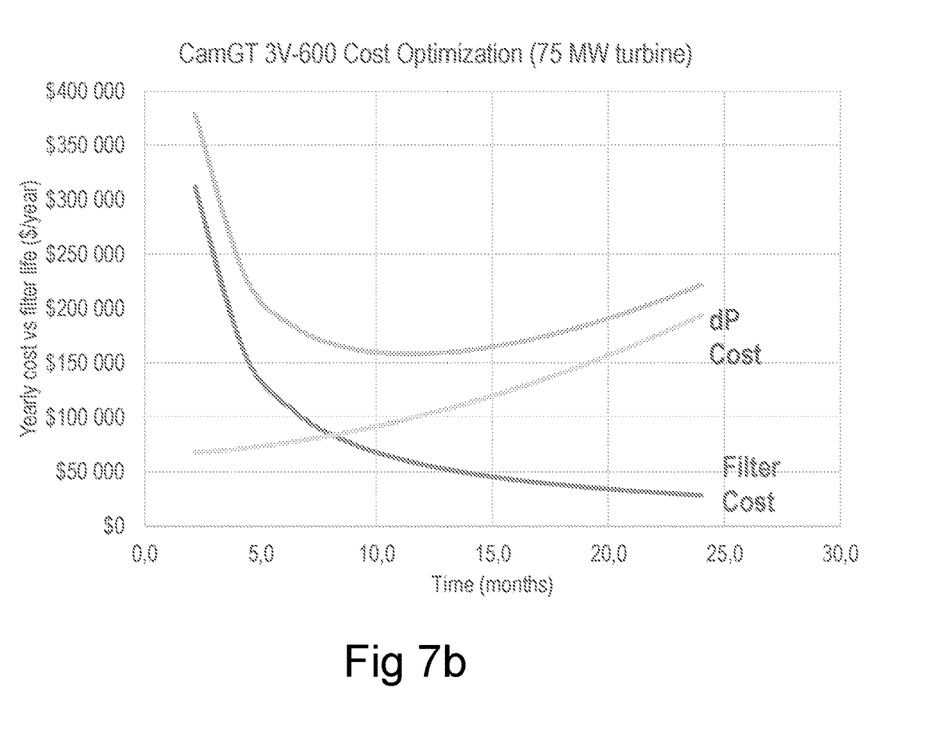

The air filter devices are used to gather the sensor data that is transmitted to an air filter control station on a regular basis. Each operator of an industrial installation is able to access data relating to conditions of their specific installation from the air filter control station. According to an aspect of the disclosure, a communications interface to the air filter control station is provided by means of a web site, an application for a tablet or an application for a mobile device. Such a user interface is represented in FIG. 7a. The user interface may be accessible by the operator of the industrial installation, but also by the filter provider so that there is an increased readiness to provide replacement filters according to actual needs rather than according to a pre-calculated filter replacement program. Data representing life expectancy of the filter and associated filter costs over the estimated life time may be presented in graphical images. FIG. 7b illustrates a graphical presentation of life cycle cost of the filter and a cost associated with continued operation of the deteriorating filter, i.e., costs relating to a reduction in output from the power plant. According to other aspects of the disclosure, a power plant operator may provide additional operational data to the air filter control station.

In the air filter control station, the collected data is processed. Such processing implies correcting data for flow conditions, creating historical trend lines for pressure drop, dP, based on measured data, and forecast future dP based on the historical trend lines. According to aspects of the disclosure, the air filter control station also converts the pressure drop value into a monetary value to visualize a decrease in production output due to pressure drop.

In a communication interface of the air filter control station, the end user receives visual information on time until the filters need to be replaced due to technical reasons, i.e. pressure loss; time until filter replacement is recommended for commercial reasons; cost savings for making the filter replacement based on commercial reasons rather than technical reasons. An important aspect in the presentation of commercial aspects is the degradation in the performance of the industrial installation, e.g., suffered from degradation of the airflow to the combustion chamber of the combustion turbine.

Figure 5:
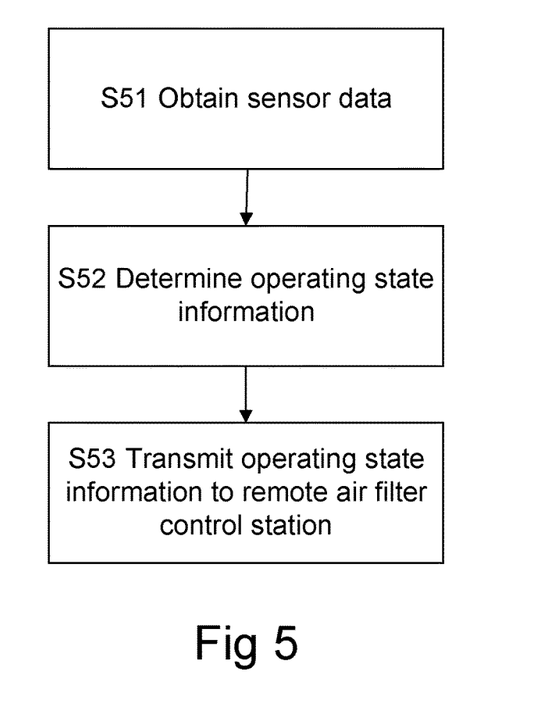
FIG. 5 is a flow diagram of exemplary method steps performed in an air filter device.

FIG. 5 discloses a flow diagram of exemplary method steps performed in an air filter device. The air filter device is configured to obtain S51 sensor data using well known sensor technology. Such sensor data comprises sensor data generated from state of the art sensors arranged on or in the air filter arrangement. From the system perspective, the invention is not limited to a certain placement of the sensors, even though a compact, smart air filter device provides a number of benefits for the accuracy in the measured sensor data and for the ability to replace defective sensors without delay. The air filter device further comprises a microprocessor configured to process S52 the obtained sensor data to determine operating state information representing an operating state of the air filter arrangement where the air filter device is located. The air filter device transmits S53 the operating state information to a receiving remote air filter control station. The transmission of processed sensor data from the air filter sensor device to the air filter control station may at least in part be performed over a wireless communication link.

Figure 6:
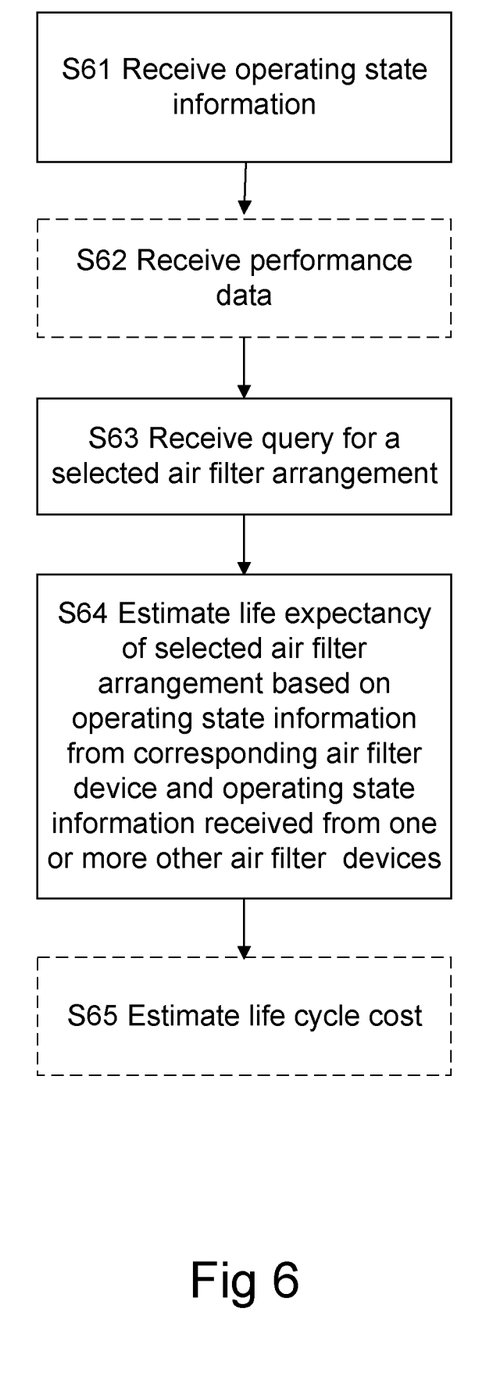
FIG. 6 is a flow diagram of exemplary method steps performed in an air filter control station.

FIG. 6 discloses a flow diagram of an example method performed in an air filter control station for air filter management in an air filter management system. In its most general context, the method comprises receiving S61 operating state information from a plurality of air filter devices. According to an aspect of the disclosure, the air filter devices may also be arranged to receive S62 performance data relevant for the industrial installation wherein the air filter arrangement is operated. In a further step, the air filter control station receives S63 a filter condition query relevant for a selected air filter arrangement of one or more air filter devices in the air filter management system. The air filter control station processes the query and estimates S64 a life expectancy of the selected air filter arrangement based on operating state information received from the corresponding air filter device and on operating state information received from one or more other air filter devices. In an optional step, a life cycle cost is estimated based on the estimated life expectancy and performance data for the industrial installation of the selected air filter arrangement. In the assessment of life cycle cost, a filter replacement cost derivable from the estimated life expectancy may be compared to the operational costs derivable from use of the air filter arrangement in the industrial installations, e.g., the costs associated with a reduced output from a combustion turbine power plant when operating using an air filter arrangement approaching the end of its life time. As previously mentioned, such reduced output may result from a reduced air inflow to support the combustion process.

The query is received S63 over a user interface accessible to an operator of the industrial installation, e.g. a power plant operator, and/or to filter maintenance personnel or any other authorized recipient. The estimate for a life expectancy of the selected filter arrangement may either be performed upon receipt of data in the system, i.e., for any filter in the air filter arrangement as soon as new data is entered into the system or on receipt of a query relating to life expectancy of a given air filter arrangement. Preferably, life expectancy for all air filter devices enlisted with the air filter control station is continuously updated as soon as new data is received in the system.

The estimate of life expectancy of a selected air filter arrangement is preferably achieved by using metamodeling, such as the Kriging model, that allows for a design optimization in an iterative process without undue computing efforts. However, the specific modelling principles for estimating the life expectancy are not part of the present invention where a life expectancy estimate may be derived from use of a plurality of modelling techniques.

FIG. 7a discloses an example of a user interface to an air filter control station, wherein at least part of the software and processing capability of the air filter control station is embodied in a tablet. FIG. 7b discloses an example of a graphical image disclosing operator aspect, wherein a cost impact of air inlet to the combustion turbine is calculated and displayed. The cost impact includes increases in the fuel cost, loss of output power due to pressure loss in the filter, and filter replacement cost. While the filter replacement cost is diminishing over time, the cost trend for production loss is the opposite. Having access to accurate estimates of these costs and the expected filter life time, it is possible to calculate, in real time, the most optimal filter replacement or conditioning interval and to receive advice on monetary savings that may be gained from following a recommendation to change filter at a given point in time.

According to an aspect of the disclosure, the air filter control station may be a cloud application wherein data is collected and analyzed at regular intervals, e.g., once per day. Each customer receives a login and password that gives them access to filter data for some or all combustion turbines in their fleet. The customer is able to determine the condition of every air flow inlet to the combustion turbine power plants, the technical lifetime of the filter arrangement and the economic lifetime for the filter arrangement, i.e., the point in time when the cost of maintaining the filter in further operation surpasses the cost for exchanging the filter. Data from the air filter control station may also be accessible to filter replacement providers so that they are able to improve service with regard to aftermarket filter replacement sales, but also to suggest amendments to the filter configurations based on historical performance data.

The present invention also relates to a computer program product arranged to perform the above disclosed method steps when executed in an air filter management system comprising a plurality of air filter devices and an air filter control station.

The air filter device and the air filter management system disclosed in the description above provide the advantage of enabling access to additional data for estimating costs and benefits of a filter replacement. Furthermore, the air filter device provide access to more reliable filter data delivered to the air filter management system, thus improving the quality of the estimations even further.

The invention claimed is:

1. A system for air filter management, the system comprising:
   a plurality of air filter devices, wherein each air filter device is provided at an air filter arrangement in an air flow inlet to an industrial installation, the air filter arrangement comprising:
      at least one filter medium capable of removing particulate material and/or airborne molecular contamination, AMC, from an air flow received at the air flow inlet, wherein each air filter device comprises:
         a set of sensors arranged to gather sensor data representative of an operating state of the air filter arrangement; and
      a microprocessor arranged to determine operating state information for the air filter arrangement based on the gathered sensor data and a first communication unit arranged to transmit the operating state information; and
   an air filter control station comprising:
   a second communication unit arranged to receive the operating state information from the first communication unit for a plurality of air filter devices;
   a user interface for selecting an air filter arrangement; and
   processing circuitry arranged to estimate a life expectancy of the selected air filter arrangement based on operating state information received from an air filter device provided at the selected air filter arrangement and operating state information received from one or more other air filter devices provided at other air filter arrangements.

2. The system of claim 1, wherein at least one of the one or more other air filter devices is provided at an air filter arrangement in an air flow inlet to another industrial installation.

3. The system of claim 1, wherein the set of sensors comprises one or more of a flow sensor, a humidity sensor, an ambient dust concentration sensor and a pressure drop sensor.

4. The system of any of claim 1, wherein the air filter control station is further arranged to receive performance data for industrial installations corresponding to respective air filter arrangements, and to estimate a life cycle cost based on the estimated life expectancy and performance data for the industrial installation of the selected air filter arrangement.

5. The system of claim 4, wherein the life cycle cost estimate is also based on performance data received from one or more other air filter devices provided at other air filter arrangements.

6. The system of claim 4, wherein each air filter device is further arranged to obtain performance data for the industrial installation of the respective air filter arrangement and to transmit the obtained performance data to the air filter control station.

7. The system of claim 6, wherein the performance data is received over the user interface.

8. The system of claim 7, wherein the operating state information is a trend-line of pressure drop, dP, in the air filter device.

9. The system of claim 8, wherein the trend-line of pressure drop, dP, in the air filter device is calculated from a correlation of sensor data from one or more filter pressure drop sensors, and sensor data of at least one flow sensor, ambient dust concentration sensor and/or humidity sensor.

10. The system of claim 6, wherein the industrial installation is a combustion turbine power plant, a turbine powered compressor station, or a turbine powered mechanical drive.

11. The system of claim 10, wherein the performance data represents an output of the combustion turbine power plant.

12. A method performed in an air filter control station of the system for air filter management according to claim 1, the method comprising:
   receiving operating state information from a plurality of air filter devices, each air filter device provided at an air filter arrangement,
   receiving a query, over a user interface, for a selected air filter arrangement of an air filter device; and
   estimating a life expectancy of the selected air filter arrangement based on operating state information received from an air filter device provided at the selected air filter arrangement and operating state information received from one or more other air filter devices provided at other air filter arrangements.

13. The method of claim 12, further comprising:
   receiving performance data for industrial installations corresponding to respective air filter arrangements, and
   estimating life cycle cost based on the estimated life expectancy and performance data for the industrial installation of the selected air filter arrangement.

14. The method of claim 13, wherein the estimate for life expectancy is generated in response to receipt of the sensor data from a plurality of air filter devices or in response to the receipt of the query for a selected air filter arrangement of an air filter device.

15. A computer program comprising computer program code which, when executed, causes a system for air filter management to execute an operation, the operation comprising:

receiving operating state information from a plurality of air filter devices, each air filter device provided at an air filter arrangement, receiving a query, over a user interface, for a selected air filter arrangement of an air filter device; and estimating a life expectancy of the selected air filter arrangement based on operating state information received from an air filter device provided at the selected air filter arrangement and operating state information received from one or more other air filter devices provided at other air filter arrangements.

16. The computer program of claim 15, wherein the operation further comprises:

receiving performance data for industrial installations corresponding to respective air filter arrangements, and estimating life cycle cost based on the estimated life expectancy and performance data for the industrial installation of the selected air filter arrangement.

17. The computer program of claim 16, wherein the estimate for life expectancy is generated in response to receipt of the sensor data from a plurality of air filter devices or in response to the receipt of the query for a selected air filter arrangement of an air filter device.

* * * * *

UNITED STATES PATENT AND TRADEMARK OFFICE
CERTIFICATE OF CORRECTION

PATENT NO. : 10,976,065 B2
APPLICATION NO. : 16/075046
DATED : April 13, 2021
INVENTOR(S) : Joshua Kohn and Richard Ringström Page 1 of 1

It is certified that error appears in the above-identified patent and that said Letters Patent is hereby corrected as shown below:

In the Claims

Column 16, Line 5 Claim 4, after "system of" delete "any of".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*